United States Patent

Davenport

[15] 3,676,697

[45] July 11, 1972

[54] SWEEP AND GATE GENERATOR

[72] Inventor: Arthur B. Davenport, Charlottesville, Va.

[73] Assignee: Sperry Rand Corporation

[22] Filed: Oct. 23, 1970

[21] Appl. No.: 83,376

[52] U.S. Cl. ..............................307/228, 307/291, 328/128, 328/184, 328/185

[51] Int. Cl. ..........................................................H03k 4/08

[58] Field of Search ..................307/228, 291; 328/127, 128, 328/151, 181, 183, 184, 185

[56] References Cited

UNITED STATES PATENTS

| | | | |
|---|---|---|---|
| 3,049,625 | 8/1962 | Brockman | 307/228 |
| 3,164,787 | 1/1965 | Fontaine | 328/185 |
| 3,539,825 | 11/1970 | Hardaway | 307/228 |
| 3,381,229 | 4/1968 | Sikorra | 328/127 |
| 3,360,744 | 12/1967 | Blitz et al. | 328/185 X |
| 2,980,866 | 4/1961 | Naines et al. | 328/181 X |
| 2,748,272 | 5/1956 | Schrock | 328/181 X |
| 3,569,842 | 7/1968 | Schroyer | 307/228 X |

*Primary Examiner*—Stanley D. Miller, Jr.
*Assistant Examiner*—R. C. Woodbridge
*Attorney*—S. C. Yeaton

[57] ABSTRACT

A variable frequency sawtooth generator contains a high input impedance integrating amplifier driven through a resistance network from a bistable multivibrator and an adjustable voltage divider energized from a steady DC source. The multivibrator is driven into a first stable state by an externally generated trigger pulse and into a second stable state when the output voltage from the amplifier exceeds a predetermined threshold value. In the latter state, the voltage from the multivibrator balances out the voltage from the DC source and a diode shunted around the amplifier clamps the amplifier input and output circuits together. When the multivibrator is subsequently driven into the first stable state, the voltage from the multivibrator is blocked by a series diode so that only the voltage derived from the DC source is applied to the amplifier. The diode shunted around the amplifier is back-biased under these conditions and a voltage appears at the output of the amplifier which increases at a steady rate determined by the selected magnitude of the adjustable voltage.

1 Claim, 1 Drawing Figure

PATENTED JUL 11 1972 3,676,697
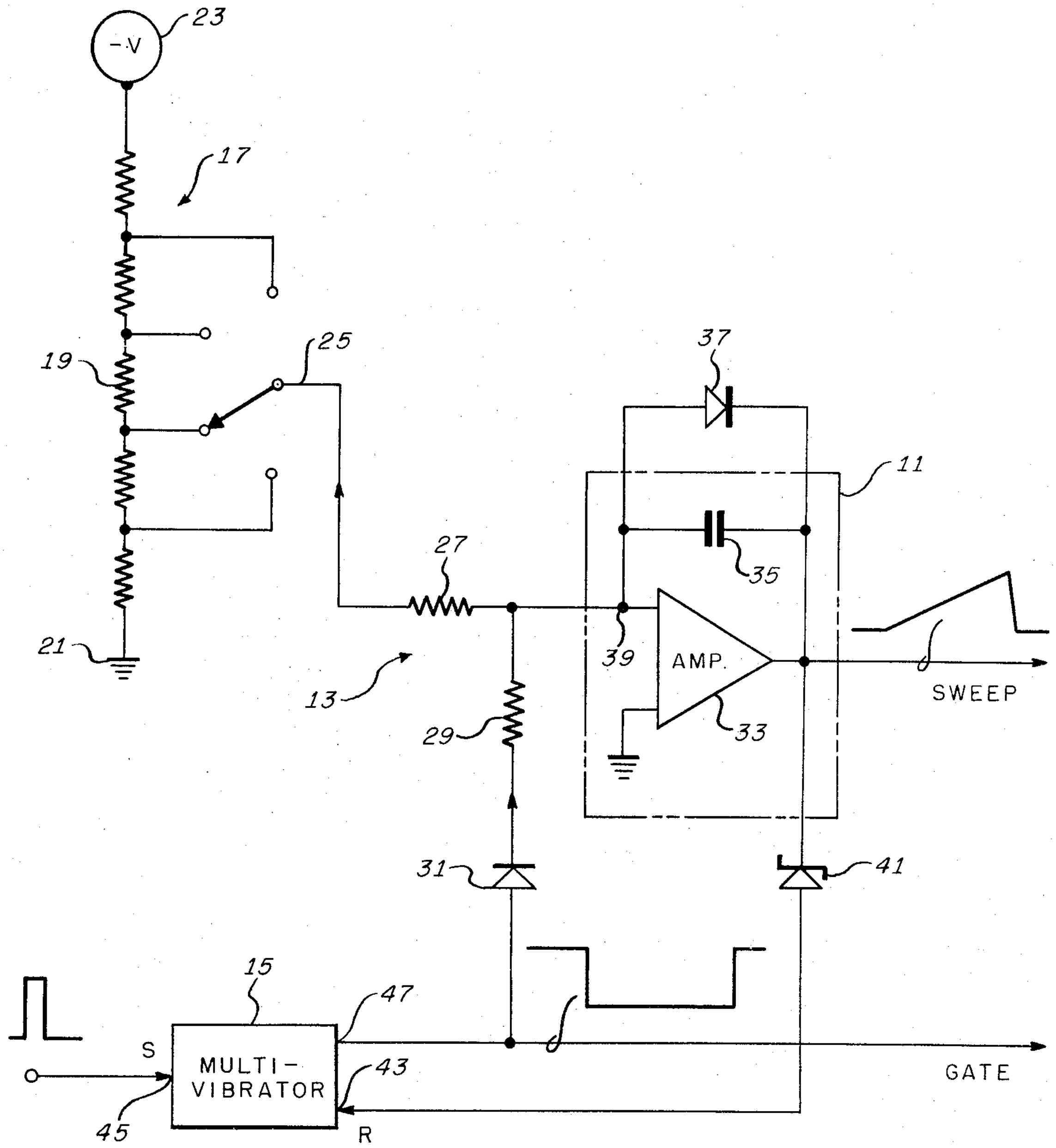
INVENTOR
ARTHUR B. DAVENPORT
BY Joseph R. Rock
ATTORNEY

SWEEP AND GATE GENERATOR

BACKGROUND OF THE INVENTION

1. Field of the Invention

The present invention relates to electrical wave generators and more specifically to sawtooth wave generators useful with cathode ray tube indicators.

2. Description of the Prior Art

Cathode ray tube displays, such as radar indicators, often require sweep and gate generators to provide sawtooth waves and gating voltages having precise yet readily adjustable characteristics. Conventional sweep and gate generating circuits typically employ a monostable multivibrator arranged so that it may be driven into its quasi-stable state by an external trigger pulse. While in the quasi-stable state, the multivibrator provides an output gate voltage and a sweep generator is enabled. The sweep generator, which is usually a bootstrap or phantastron, produces a steadily increasing voltage until the monostable multivibrator reverts to its stable state. The length of the gate and the slope of the sweep is determined by the position of a range switch. The range switch connects two sets of capacitors and resistors into the circuit so as to determine the time constants of the multivibrator and sweep generator. Thus complex timing waves must be transmitted along the conductors connecting the range switch resistors and capacitors with the multivibrator and sweep generator. This becomes particularly bothersome when the range switch must be located at a distance remote from the sweep generator so that the long conductors, which may be in a complex harness, can cause cross-talk and capacitive problems. The circuit of the present invention overcomes these problems by requiring only DC voltages for controlling both sweep and gate functions. Concomitantly with the simplified transmission requirements, the circuit of the present invention permits a reduction in the number and complexity of circuit components.

SUMMARY OF THE INVENTION

An improved electronic sweep and gate generator utilizes a bistable multivibrator for producing an enabling gate and requires only DC control voltages for determining sweep shape and gate duration.

BRIEF DESCRIPTION OF THE DRAWING

The sole FIGURE is a circuit diagram of the presently preferred embodiment of the invention.

DESCRIPTION OF THE PREFERRED EMBODIMENT

The sweep and gate generator of the present invention employs an integrating amplifier 11 which is driven through a coupling network 13 from a bistable multivibrator 15 and a range selector means 17. The range selector means comprises a series resistor means 19 connected between a ground connection 21 and a steady DC voltage source 23. As indicated in the figure, the steady DC voltage source supplies a negative voltage to the resistance means 19. Selected voltages may be applied to the amplifier 11 by means of a range switch 25. The range selector 17 is coupled to one input terminal of the amplifier 11 through a series resistor 27.

The multivibrator 15 is coupled to the same amplifier input terminal through a coupling resistor 29 and a diode 31.

The integrating amplifier is conventional and may consist of a high input impedance amplifying unit 33 shunted by a capacitor 35. The amplifying unit may be an operational amplifier. As is known in the art, the output voltage of such integrating amplifiers represents the time integral of the net voltage being applied to the input terminals of the amplifier.

A clamping diode 37 is connected between the amplifying unit input terminal 39 and the output of the amplifying unit.

The same output terminal on the amplifying unit 33 is connected through a Zener diode 41 to a RESET terminal 43 on the multivibrator 15. Externally generated trigger pulses are applied to the SET terminal 45 of the multivibrator. Gate voltages and input voltages for the amplifier 11 are supplied from an output terminal 47 on the multivibrator 15.

When the output voltage of the amplifier 11 reaches a predetermined threshold level, a signal passes through the Zener diode 41 to the RESET terminal of the multivibrator 15 and switches the multivibrator into a first bistable state so as to produce a binary ZERO output voltage. Under these conditions, a positive voltage appears at the output terminal 47 of the multivibrator. This positive voltage passes through the series diode 31 and the coupling resistor 29, permitting a relatively large current to pass through the coupling resistor and the clamping diode 37. A relatively small current passes through the series resistor 27 to the range selector means. The network means 13 is proportioned so that under these conditions, the amplifier input terminal 39 is essentially at ground level so that the multivibrator voltage effectively balances out the voltage from the range selectors. The clamping diode 37 maintains the output voltage of the amplifier 11 at approximately the same level. Under these conditions, substantially no voltage output is produced by the amplifier 11.

Upon the reception of an externally generated trigger pulse, the multivibrator 15 is switched into its second binary state so as to produce a negative-going output pulse. This pulse constitutes a binary ONE signal which gates the circuits to be driven. Since the output voltage of the multivibrator is now at a relatively negative value, the diode 31 blocks this signal so that only the selected portion of the steady DC voltage is applied to the amplifier through the series resistor 27. Since the net voltage applied to the terminal 39 under these conditions has a negative polarity, the clamping diode 37 prevents this voltage from being applied to the output of the amplifier 11.

The amplifier 11 now produces a steadily increasing output voltage whose slope is determined by the magnitude of the voltage being applied from the range selector means.

When the sweep voltage from the amplifier output reaches a predetermined level, the multivibrator is switched to its RESET state, the gate voltage is terminated, and the output voltage from the multivibrator is again applied to the input terminal 39 of the amplifier 11 so as to balance out the voltage from the range selector means.

Since only DC voltages are applied to the amplifier from the range selector means, no critical switching pulses need be applied to the amplifier from this range selector means. The range selector means may be located at a remote point without the danger of cross-talk or interference. If desired, simple filter means may be applied to the transmission line between the range selector means and the amplifier to eliminate spurious transients.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A sweep and gate generator comprising:

range selector means including an adjustable resistance voltage divider, a source of steady DC voltage connected across said voltage divider, a high input impedance inverting and integrating amplifier having a pair of input terminals, said pair of input terminals including a first input terminal and a second grounded input terminal, said amplifier further having output terminal means, means in said range selector means for applying a selected constant portion of said DC voltage to said amplifier, said portion having a negative polarity, said means including a series resistor coupled between said voltage divider and said first input terminal, bistable multivibrator means, said multivibrator means having SET and RESET terminals arranged so that a voltage pulse applied to said SET terminal drives the multivibrator out of said first bistable state and a voltage pulse applied to said RESET terminal drives the multivibrator into said first bistable state, said multivibrator providing a positive output voltage when in its first bistable state, network means responsive to the bistable state of said multivibrator for balancing out said selected portion of DC voltage when and only when said multivibrator is in said first bistable state, said network means including a first diode connected between said first input terminal and the output terminal means on said amplifier, said first diode being oriented to block current flow when said first input terminal is at a negative potential, said network means further including a second diode and a coupling resistor serially connected between the output of said multivibrator and said first input terminal, said second diode being oriented to conduct current to said first input terminal only when said multivibrator is in its first bistable state, means responsive to an externally generated trigger pulse for driving said multivibrator means out of said first bistable state and RESET means including a voltage sensitive zener diode for passing a signal from the output terminal means of said amplifier to said RESET terminal when the voltage output of said amplifier exceeds a predetermined threshold value.

* * * * *